United States Patent [19]

Radziewicz

[11] Patent Number: 4,928,506
[45] Date of Patent: May 29, 1990

[54] ANTI-THEFT LOCKING VALVE FOR MOTOR VEHICLES

[76] Inventor: Edmund Radziewicz, 1000 River Rd., Belmar, N.J. 07719

[21] Appl. No.: 350,234

[22] Filed: May 11, 1989

[51] Int. Cl.⁵ ............................................. F16K 35/00
[52] U.S. Cl. ........................................ 70/176; 70/179; 70/242; 70/386; 137/315; 137/384.6; 137/599.2
[58] Field of Search .................................. 70/242-244, 70/175-177, 179, 237, 386; 137/384.2, 384.4, 384.6, 384.8, 383, 377, 599.2, 315

[56] References Cited

U.S. PATENT DOCUMENTS

| 674,582 | 5/1901 | Lewy | 70/176 |
|---|---|---|---|
| 1,279,954 | 9/1918 | Williams | 70/176 |
| 1,379,292 | 5/1921 | Szameit | 70/175 |
| 3,630,306 | 12/1971 | Shur | 70/243 X |
| 4,489,748 | 12/1984 | Fleutsch | 137/384.6 X |

FOREIGN PATENT DOCUMENTS

| 0253431 | 1/1988 | European Pat. Off. | 70/252 |
|---|---|---|---|
| 832860 | 2/1952 | Fed. Rep. of Germany | 137/384.2 |
| 15485 | of 1908 | United Kingdom | 70/242 |
| 210989 | 2/1924 | United Kingdom | 70/243 |

Primary Examiner—Lloyd A. Gall
Attorney, Agent, or Firm—Clifford G. Frayne

[57] ABSTRACT

An anti-theft tamper-proof lock valve for automobile applications for securing the fuel line or the hydraulic brake line to prevent theft having a manually-operated lock in communication with a slide valve positioned in the fluid line, the slide valve selectively movable from an open to a closed position, the slide valve locking in a closed position if the communication conduit between the lock and the valve is subject to tampering.

6 Claims, 4 Drawing Sheets

ANTI-THEFT LOCKING VALVE FOR MOTOR VEHICLES

FIELD OF INVENTION

The present invention relates to a valve which operates as an anti-theft device for motor vehicles by disrupting the flow of fuel from the fuel tank to the engine when placed in the fuel line or by maintaining the brakes in an engaged position by limiting the release of brake fluid pressure to the brakes, both valve mechanisms having an anti-tampering design which automatically engages the valve in a closed or disrupting position if attempts are made to tamper with the valve.

BACKGROUND OF THE INvENTION

Automobile theft is an increasing problem in society which impacts not only on the owner of the stolen car, but on all vehicle operators through increased insurance rates. A great deal of attention has been given to providing security for unattended automobiles. These methods have ranged from separate, hidden ignition locks often working in conjunction with sirens or alarms, steering wheel locking apparatus and hidden electrical cutoff switches.

Additionally, attention has been directed towards means for disrupting the flow of fuel from the fuel tank to the engine in order to limit the distance in which an auto thief could operate the stolen vehicle. These fuel disruption or locking valves vary in design and structure as disclosed in U.S. Pat. No. 2,845,943 to Perkins; U.S. Pat. No. 3,838,587 to Good; U.S. Pat. No. 4,554,946 to Poole; U.S. Pat. No. 4,084,657 to Bradley; U.S. Pat. No. 4,131,127 to Ferro; U.S. Pat. No. 3,885,586 to Tibbetts; U.S. Pat. No. 3,771,547 to Coleman and U.S. Pat. No. 3,879,969 to Pynn.

All of the aforementioned devices use a lock and tumbler means to activate a locking valve similar to the disclosure hereafter by Applicant. All of the aforementioned patents disclose a structure for disrupting the flow of fuel to the engine so that the potential auto thief, if successful in entering the car and engaging the engine, would be limited in the distance he could drive the stolen vehicle by the amount of fuel in the gas tank forward of the locking valve together with the fuel contained in the carburetor. The locking valve, if hidden, would result in the automobile running out of gas at an inopportune time for the car thief. Of the aforementioned patents, only Coleman, in U.S. Pat. No. 3,771,547, appears to design the locking valve for use not only with the fuel line, but with the brake system.

The optimum position for the potential user of the locking valve disclosed in the aforementioned patents would be in a position not readily viewable by the potential car thief. If the car thief were to locate such a locking valve, such a valve could be rendered inoperable if the car thief had the appropriate master key or was able to tamper with the lock.

Applicant's invention accomplishes the same function as the aforementioned patents, only Applicant has incorporated an anti-tampering device with his valve which would automatically lock the valve in a closed position disrupting the flow of fuel or brake fluid which would result in the vehicle becoming inoperable at an inopportune time for the car thief. Tampering with Applicant's device results in the locking device engaging within a housing beneath the vehicle in the fuel or brake line which would require removal of the housing for resetting, a task which a car thief would not normally choose to perform thus ensuring that the vehicle could only be moved a short distance before becoming inoperable to the automobile thief.

OBJECT OF THE INVENTION

An object of the present invention is to provide for a novel anti-theft locking device which disrupts the flow of fuel in the fuel line of a motor vehicle.

Another object of the present invention is to provide for a novel anti-theft locking device for disrupting the fuel flow in the fuel line of a motor vehicle and which will automatically lock the valve in a closed position if tampered with by the potential thief.

A still further object of the present invention is to provide for a novel anti-theft valve lock disposable in the brake line of a motor vehicle which will prevent the release of brake pressure and thus keep the brakes engaged;

A still further object of the present invention is to provide for a novel anti-theft valve lock for a motor vehicle which is disposed in the brake line of the vehicle and which will automatically dispose to the closed position if tampered with thus engaging the brakes of the vehicle.

A still further object of the present invention is to provide for a novel anti-theft valve lock for motor vehicles in which the valve lock mechanism is enclosed within a housing which prevents tampering with the reset mechanism.

SUMMARY OF THE INVENTION

These and other objects of the present invention are achieved by an anti-theft valve lock disposed in the fuel line or brake line of a motor vehicle having a valve slide with aperture aligned to allow the flow of brake fluid or fuel when aligned with the fuel line or brake line, and sealing the fuel line or brake line when engaged in the closed position; the valve slide operable by a key and tumbler mechanism, the key and tumbler mechanism in communication with the valve slide by means of a plurality of ball bearings within a conduit cable for activating or deactivating the valve slide; the valve slide positioned within a chamber having a locking arm engageable with recesses in the valve slide automatically locking the valve slide in a closed position if the key and tumbler mechanism is tampered with or the conduit cable is cut.

BRIEF DESCRIPTION OF THE DRAWINGS

A better understanding of the present invention as well as other objects and advantages thereof will become apparent upon consideration of the detailed disclosure thereof, especially when taken with the accompanying drawings wherein.

DETAILED DESCRIPTION OF THE DRAWINGS

Figure 1:
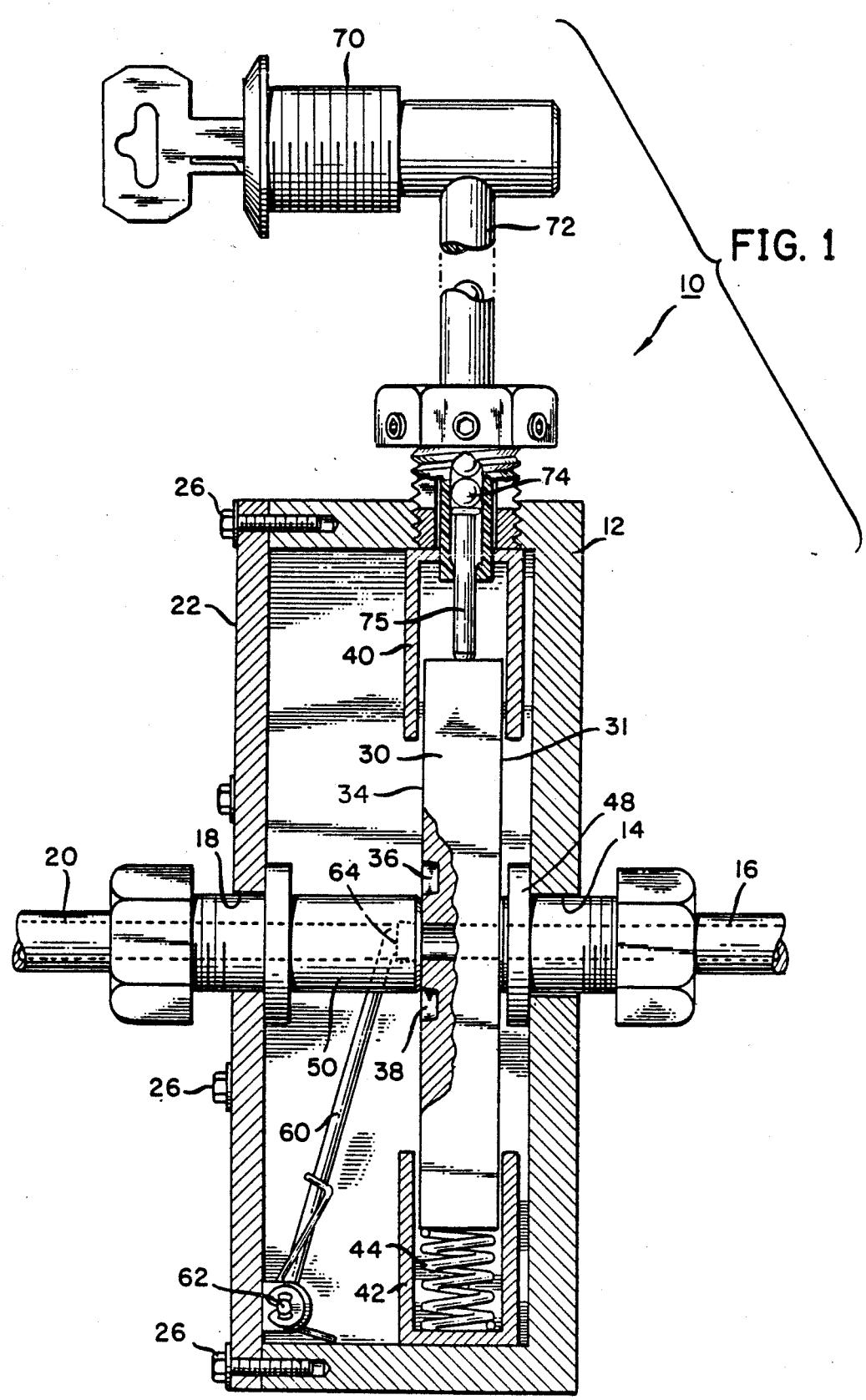
FIG. 1 is a side elevational cross sectional view of the locking in conjunction with a fuel line.

Referring to FIG. 1, there is shown a side cross sectional elevational view of the anti-theft locking valve for use in conjunction with a gas line or fuel line. The valve assembly 10 comprises a housing 12 having an inlet port 14 for connection to the fuel line 16 which is connected to the gas tank. Housing 12 has an outlet port 18 for connection to fuel line 20, fuel line 20 being in communication with the carburetor or fuel injection means for the automobile. Housing 12 can be of any suitable configuration in order to accommodate the valve mechanism and locking mechanism as described hereafter. Housing 12 requires an access plate 22 secured to housing 12 which face plate 22 is removably secured to housing 12 to permit access to the interior of housing 12 in order to reset the valve as described hereafter if it is in the locked position. Face plate 22 is secured to housing 12 by a plurality of securing means which, in this embodiment, comprise a plurality of Allen-head bolts 26.

Figure 2:
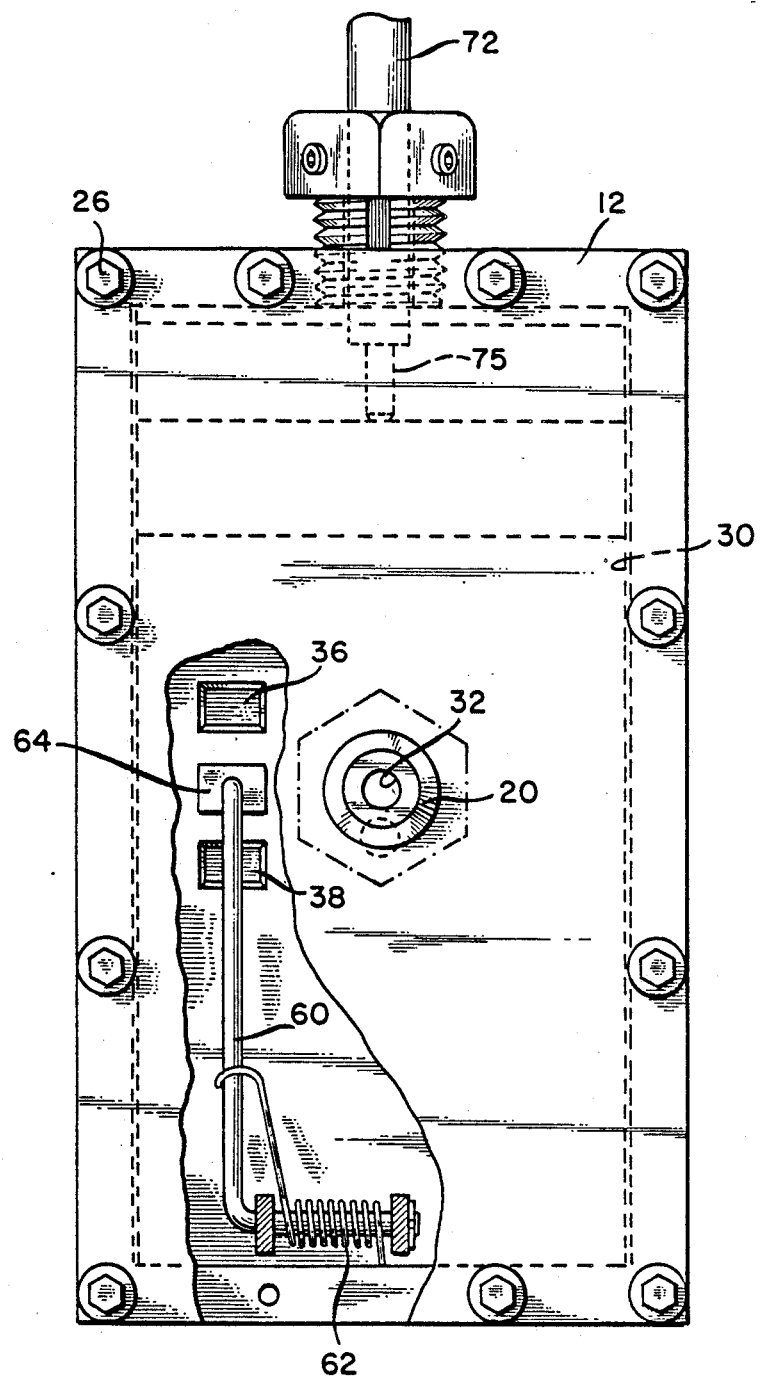
FIG. 2 is a front elevational view of the valve mechanism and locking mechanism.

Disposed on the interior of housing 12 between inlet port 14 and outlet port 18 is a slide valve 30. Slide valve 30 is generally rectangular in cross sectional area as can be seen from FIG. 2, and has an aperture 32 passing therethrough, aperture 32 for alignment with the inlet port 14 and outlet port 18 of the fuel line. Slide valve 30 has positioned on its front face 34, facing outlet port 18, an upper locking groove 36 and a lower locking groove 38. Locking grooves 36 and 38 are in vertical alignment with each other and offset from aperture 32.

Slide valve 30 is slidably positioned perpendicular to the access of inlet port 14 and outlet port 18 within an upper slide guide 40 and lower slide guide 42, upper slide guide 40 depending downwardly from the upper interior surface of housing 12 and lower slide guide 42 depending upwardly from the lower interior surface of housing 12. The resilient compressible spring means 44 is positioned below slide valve 30 in lower slide guide 42 to provide resilient compression to slide valve 30 and aid in positioning slide valve 30 as described hereafter.

Depending inwardly from inlet port 14 is an inlet conduit 48 which extends inwardly and terminates in contact with rear face 31 of slide valve 30. Depending inwardly from outlet port 18 is outlet conduit 50 which extends inwardly and terminates in contact with front face 34 of slide valve 30. Inlet conduit 48 and outlet conduit 50 are in axial alignment with each other and aperture 32 and slide valve 30 corresponds to the cross sectional area of inlet conduit 48 and outlet conduit 50 so as to define a fluid passageway through housing 12 when aperture 32 is in alignment with inlet conduit 48 and outlet conduit 50.

Positioned within housing 12 is a pivot arm 60 having its first end mounted to a pivot spring 62 and its second end having secured thereto, an engaging latch 64, engaging latch 64 in slidable contact with slide valve 30, this slidable contact is in vertical alignment with indents 36 and 38 in the front face of slide valve 30.

Slide valve 30 is activated by means of a locking device which comprises a key operated tumbler mechanism 70 positioned within the passenger compartment of the automobile. Key activated tumbler 70 is in communication with slide valve 30 by means of a conduit 72, conduit 72 having positioned therein, a plurality of ball bearings 74 axially aligned and in contact with each other. Conduit 72 terminates on housing 12 proximate to the upper end of slide valve 30. In this configuration, activation of tumbler lock mechanism 70 by means of a key means, compresses ball bearing 74 within conduit 72 thereby affecting the vertical disposition of slide valve 30 in the compression or relaxation of positioning spring 44. Ball bearing 74 extends from tumbler lock mechanism 70 through conduit 72 to housing 12 and terminate in contact with pin 75.

In the normal operation of slide valve 10, the key mechanism and lock tumbler means 70 would be activated to cause ball bearing 74 to exert pressure on slide valve 30 by means of pin 75 thus compressing spring 44 and moving aperture 32 out of alignment with conduit 48 and conduit 50. In this configuration, fuel flow from the gas tank is disrupted with the only fuel available to the engine being that fuel in the line forward of slide valve 30, that fuel being within conduit 50, outlet port 18 and the remaining fuel line leading to the engine. Releasing pressure on slide valve 30 by means of the key means and locking tumbler 70, releases pressure such that compression spring 44 causes slide valve 30 to move upwardly thus aligning aperture 32 in alignment with conduit 48 and conduit 50 and permitting the normal flow of fuel from the gas tank to the engine under normal operating conditions. As best can be seen from FIG. 2, the movement of aperture 32 into alignment with conduits 48 and 50, and out of alignment with conduits 48 and 50 in order to disrupt the flow does not cause engaging latch 64 to engage recessed indents 36 and 38. There is sufficient clearance along the face of slide valve 30 to permit the normal operation of slide valve 30 by means of the tumbler means without engagement of the locking device.

When the owner/operator of the vehicle parks the vehicle, he or she engages the locking mechanism by operating the key means and tumbler locking means 70 to engage slide valve 30 in the closed position. If the vehicle is started, it can only be driven the distance with respect to the fuel in the fuel line forward of slide valve 30. At some point in time, the engine will stall due to fuel starvation. Since the owner/operator is aware of this, the owner/operator can operate the tumbler means 70 to bring aperture 32 of slide valve 30 into alignment with the conduit before starting the car to ensure adequate fuel.

If a potential car thief is able to hot wire the automobile or overcome the ignition lock and start the vehicle without disengaging slide valve 30, the potential thief will only be able to drive the car the distance permitted by the fuel in the line forward of slide valve 30.

If the potential thief is aware of the locking device, and attempts to disengage the locking tumbler means 70 or dismantle conduit 72, the locking means incorporated in housing 12 will engage. This locking means incorporates slide valve 30 and pivot arm 60 and engaging latch 64. If the tumbler means 70 is removed or conduit 72 is severed, the pressure downwardly on slide valve 30 is released such that compression spring 44 causes slide valve 30 to move upwardly moving aperture 32 vertically above axial alignment with conduits 48 and 50 and causing engaging latch 64 to engage lower recessed indent 38 thus locking slide valve 30 in a position where aperture 32 is vertically disposed above conduits 48 and 50 and not in alignment with same. Pivot spring 62 maintains pressure on pivot arm 60 causing engaging latch 64 to remain in position with recessed indent 38 such that any manual downward force through conduit 72 onto slide valve 30 will not permit slide valve 30 to move in a vertical downward position to realign aperture 32 with conduits 48 and 50.

The same locking mechanism engages with upper recessed indent 36 if the potential car thief attempts to manipulate tumbler lock 70 or the ball bearing 74 in conduit 72 by maintaining pressure on the conduit 72 after severing conduit 72 and attempting to force pressure onto slide valve 30 by means of compressing ball bearing 74 and conduit 72. Such pressure without being able to view slide valve 30, will result in aperture 32 being vertically disposed below the axial alignment of conduit 48 and conduit 50 and cause engaging latch 64 to engage upper recessed indent 36 thus locking slide valve 30 in position with aperture 32 disposed below fuel line conduit 48 and 50. In either instance, the potential car thief is limited in the distance he can operate the vehicle by the fuel positioned in the fuel line forward of slide valve 30.

In order to reset slide valve 30, it would naturally be necessary to repair conduit 72 or tumbler lock 70 if damaged, but face plate 22 would also have to be removed by means of securing means 26 in order to disengage engaging latch 64 on pivot arm 60 from either recessed indent 36 or recessed indent 38.

The embodiment shown herein discloses the anti-tampering lock mechanism positioned within housing 12 forward of slide valve 30. The locking mechanism could also be positioned on the inlet side of housing 12 with access plate 22 also positioned on the inlet side of housing 12 without departing from the spirit of the invention.

Figure 3:
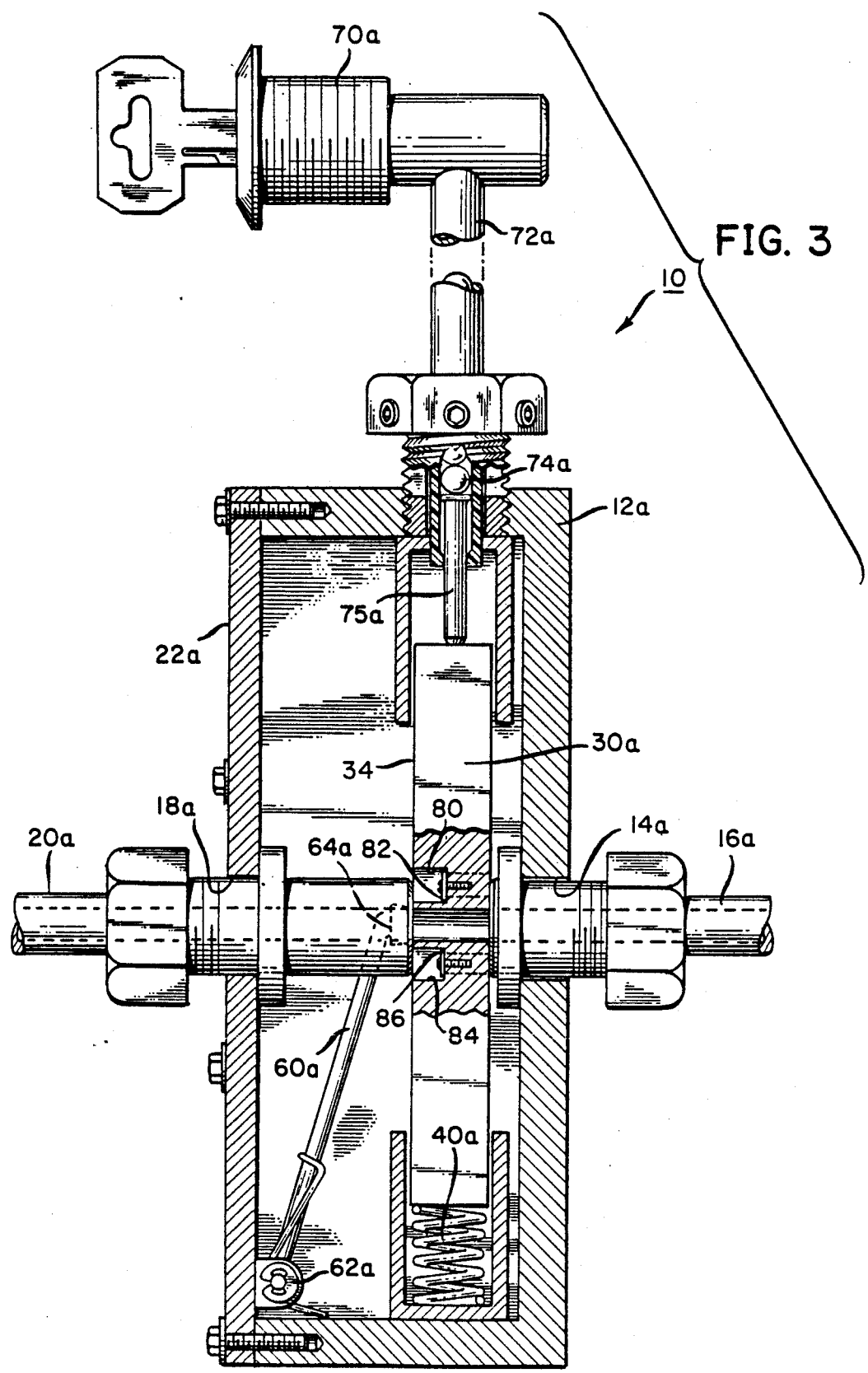
FIG. 3 is a side cross sectional elevational view of the locking assembly for use with a brake line.
Figure 4:
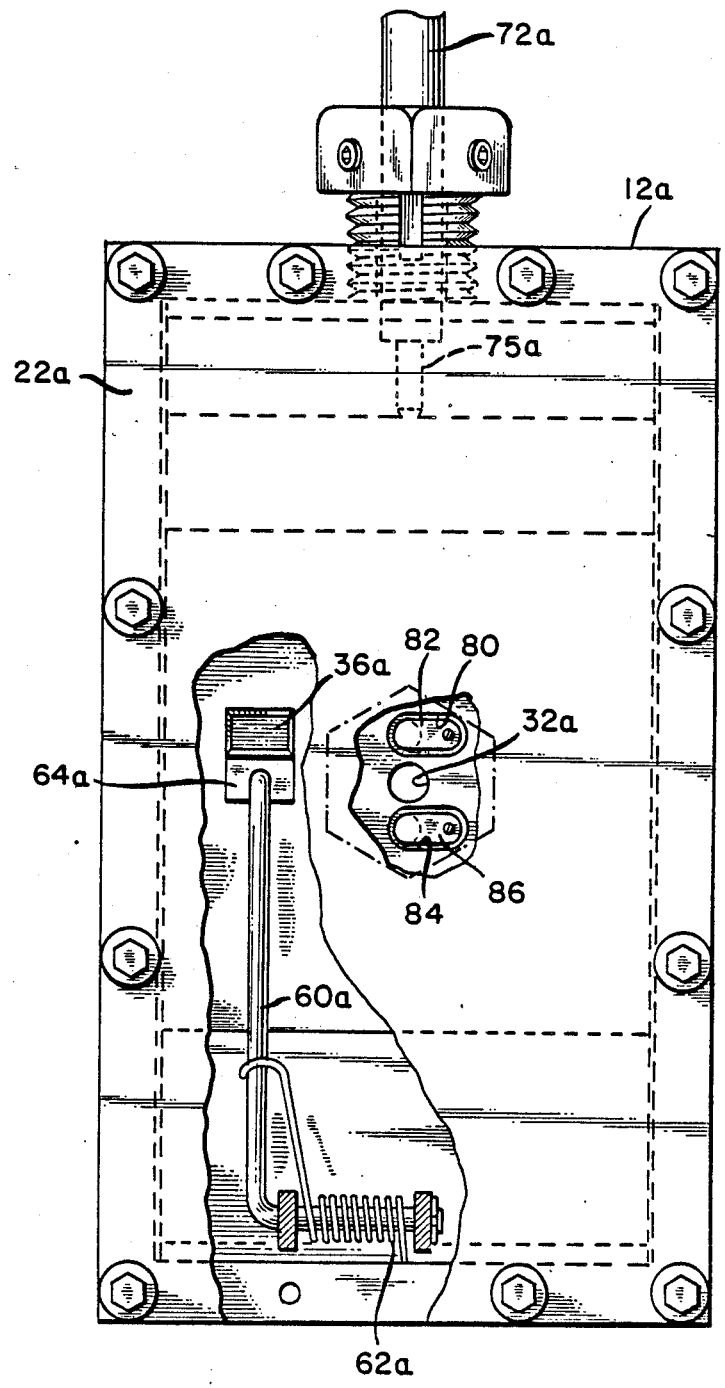
FIG. 4 is a front elevational view of the valve assembly in association with a brake line.

Referring to FIGS. 3 and 4, there is shown a cross sectional elevational view of the locking valve assembly and a front elevational view of the valve assembly when utilized in the hydraulic brake line of the vehicle. The apparatus as utilized in the hydraulic brake line is substantially similar to that of the apparatus when used with respect to the fuel line with the exception being that the slide valve as described hereafter, utilized in the brake line, positions a one-way valve in alignment with the brake line when in the locked position. This embodiment, as more fully described hereafter, allows brake fluid from the reservoir to flow to the brakes when in the locked position, but does not permit the release of hydraulic pressure. Thus, a potential car thief who was either unaware of the locking device or tampered with the locking device such that it positioned itself in the locked position would find increased resistance to movement each time the brakes were activated ultimately reaching the point where the brakes were fully engaged without any pressure on the brake pedal, thus causing the vehicle to be immobilized.

Referring specifically to FIG. 3 which is a side cross sectional elevational view of the locking valve assembly for use with the brake line, there is shown a housing 12a having an inlet port 14a for connection with the brake line 16a which is connected to the brake fluid reservoir. Housing 12a has an outlet port 18a for connection to the brake line 20a, brake line 20a being in communication with the individual brakes of the vehicle. Again, housing 12a would have an access plate 22a removably secured to permit access to the interior of the housing in order to reset the valve as described hereafter if it is in the locked position. Face plate 22a would be secured to housing 12a in a manner similar to that of the fuel line embodiment.

The interior of housing 12a would be identical with that of the interior of housing 12 in the fuel line. The major difference with respect to housing 12 of the fuel line and housing 12a of the brake line would be with respect to the slide valves. Slide valve 30a in the brake line would have an aperture 32a for alignment with inlet port 14a and outlet port 18a to permit the flow of hydraulic brake fluid in an unrestricted manner when engaged in the open position by the operator. Slide valve 30a in the brake line embodiment would have a second aperture 80 positioned in vertical alignment above first aperture 32a, second aperture 80 having a one-way valve 82 positioned therein. One-way valve 82 could be of a reed valve construction which would permit the flow of hydraulic brake fluid from inlet port 14a through housing 12 and outlet port 18a and thus to the individual brakes of the vehicle. One-way valve 82 when engaged in alignment with inlet port 14a and outlet port 18a, would not permit the return flow or release of hydraulic pressure when the footbrake had been disengaged.

A third aperture 84 positioned in vertical alignment below aperture 32a would also have positioned therein a one-way valve 86 of the reed valve variety. Third aperture 84 and valve 86 would function in an identical manner as second aperture 82.

Slide valve 30a in the brake line locking mechanism would operate in a manner similar to slide valve 30 in the fuel line locking mechanism. The operator would activate the locking device by a key operated tumbler mechanism 70a, key operated tumbler mechanism 70a in communication with slide valve 30a by means of conduit 72a having positioned therein, a plurality of ball bearings 74a axially aligned and in contact with each other. In this configuration, the activation of tumbler lock mechanism 70a by means of a key means, compresses ball bearing 74a within conduit 72a and pin 75a thereby affecting the vertical disposition of slide valve 30a in the compression or relaxation of a positioning spring 40a, similar to that of the fuel line embodiment.

Attempts to tamper with the key operated tumbler mechanism 70a or conduit 72a would result in slide valve 30a positioning itself such that one-way valves 82 or 86 would be in alignment with inlet port 14a and 18a with pivot arm 60a and engaging latch 64a engaging recessed indent 36a on slide valve 30a in the same manner as pivot arm 60 and engaging latch 64 engage slide valve 30 in the fuel line locking mechanism.

In order to reset slide valve 30a in the brake line locking mechanism, it would again be necessary to remove face plate 22a in order to reset pivot arm 60a and engaging latch 64a.

Again, the embodiment shown herein with respect to the brake line locking mechanism discloses the anti-tampering lock mechanism positioned within housing 12a forward of slide valve 30a. The locking mechanism could also be positioned on the inlet side of housing 12a with access plate 22a also positioned on the inlet side of housing 12a without departing from the spirit of the invention.

I claim:

1. An anti-theft, tamper-proof lock for automobile applications for securing the fuel line or hydraulic brake line to prevent theft comprising:
   a manually-operated turnkey-type tumbler lock means;
   a housing disposed in the selective fluid line having an inlet port secured to an upstream fluid line in communication with a fluid reservoir, an outlet port secured to a downstream fluid line, said outlet port and said inlet port in alignment, said housing having a removable face plate, said housing having disposed therein a channeled guide having a biased mounted slide valve disposed therein, said slide valve having an aperture therethrough for selective alignment with said inlet port and said outlet port of said housing for the passage of fluid therethrough;

a communication means comprising a conduit in communication with said turnkey-type tumbler lock means and said housing, said communication means having positioned therein, a plurality of spherical bearings in communication with each other, said conduit having a pin positioned at a housing end, said pin and said spherical bearings movably engaged through the action of said turnkey-type tumbler lock means and said biased mount for said slide valve to selectively align and disalign said aperture in said slide valve with said inlet port and said outlet port for selectively opening and closing said slide valve to permit the passage of fluid therethrough;

an anti-tamper lock mechanism disposed in said housing, said anti-tamper lock mechanism comprising a biased mounted locking arm, biasly mounted to an inside of said housing and frictionally engaged with a face of said slide valve, said locking arm in alignment with vertically aligned indents in said face of said slide valve, said indents disposed laterally from said aperture in said slide valve.

2. An anti-theft tamper-proof lock for automobile applications in accordance with claim 1 wherein said biased mount for said slide valve comprises a spring positioned beneath said slide valve in said channeled guide.

3. An anti-theft tamper-proof lock for automobile applications in accordance with claim 1 wherein said turnkeytype tumbler lock means and communication means cooperate to selectively secure said aperture in said slide valve in a selective aligned position or non-aligned position with said inlet port and said outlet port of said housing.

4. An anti-theft tamper-proof lock for automobile applications in accordance with claim 1 wherein said tampering of said communication means between said turnkey-type tumbler lock means and said housing engages said locking arm disposed in said housing in one of said vertically aligned indents in said face of said slide valve, locking said aperture in said slide valve in a non-aligned position with said inlet port and said outlet port.

5. An anti-theft tamper-proof lock for automobile applications in accordance with claim 1 wherein said slide valve disposed in said brake line comprises two secondary apertures positioned in vertical alignment above and below said aperture in said slide valve, said secondary apertures containing one-way valves permitting the flow of fluid from said inlet port to said outlet port and preventing the reversal of flow.

6. An anti-theft tamper-proof lock for automobile applications in accordance with claim 5 wherein tampering of said communication means between said turnkey-type tumbler lock means and said housing engages said locking arm disposed in said housing to engage one of said indents in said slide valve aligning one of said secondary apertures in said slide valve with said inlet port and said outlet port of said housing permitting the passage of fluid therethrough and preventing the reverse flow of fluid therethrough, thereby increasing the fluid brake pressure and immobilizing said automobile.

* * * * *